No. 713,047. Patented Nov. 11, 1902.
J. ANDERSON.
MOLDING MACHINE.
(Application filed Nov. 1, 1901.)
(No Model.) 2 Sheets—Sheet 1.
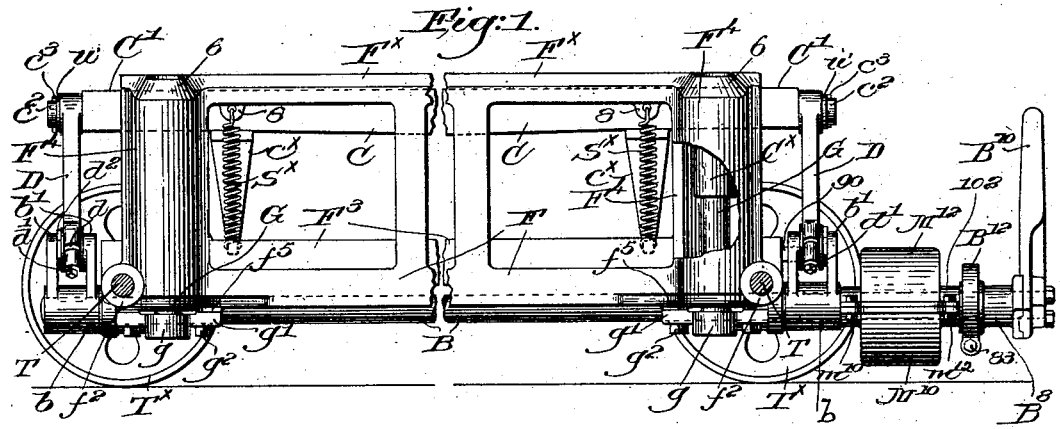
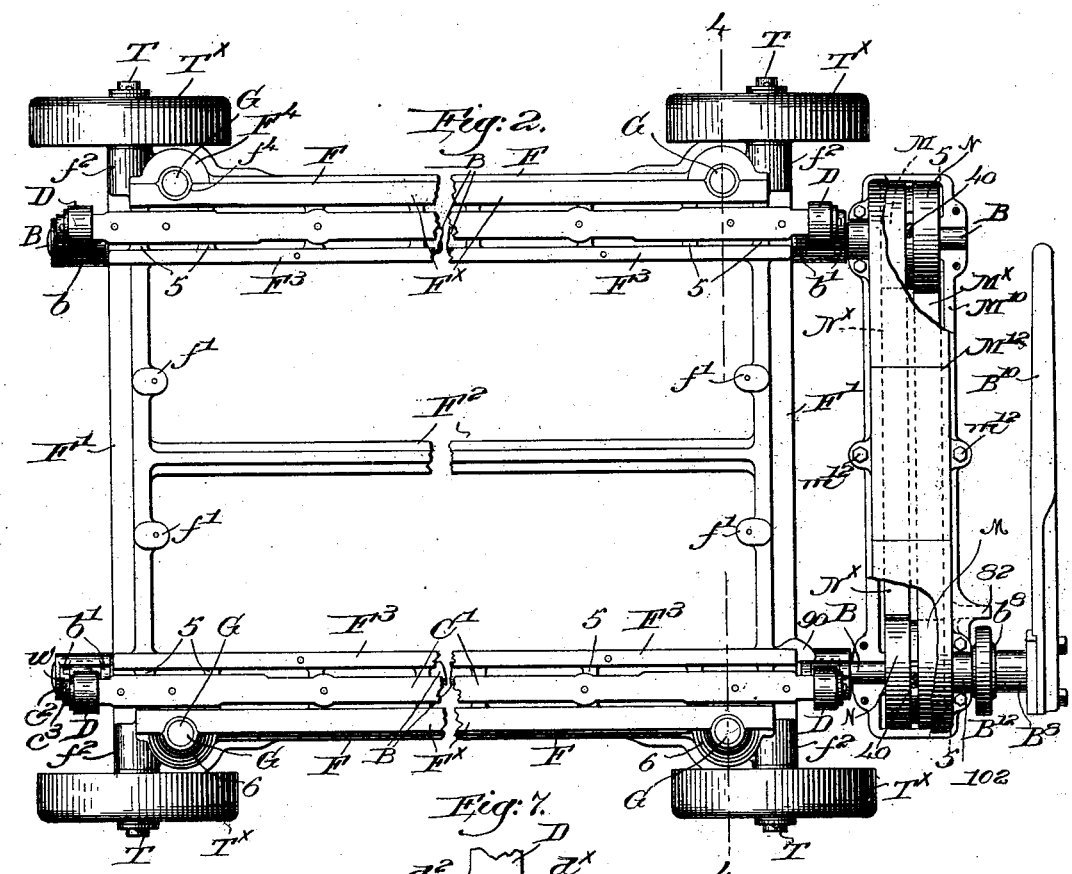
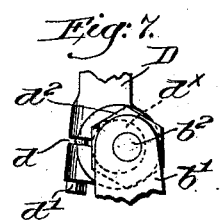
Witnesses,
Edward F. Allen.
Fred S. Greenleaf.
Inventor,
John Anderson,
By Crosby Gregory.
Attys.
THE NORRIS PETERS CO., PHOTO-LITHO., WASHINGTON, D. C.

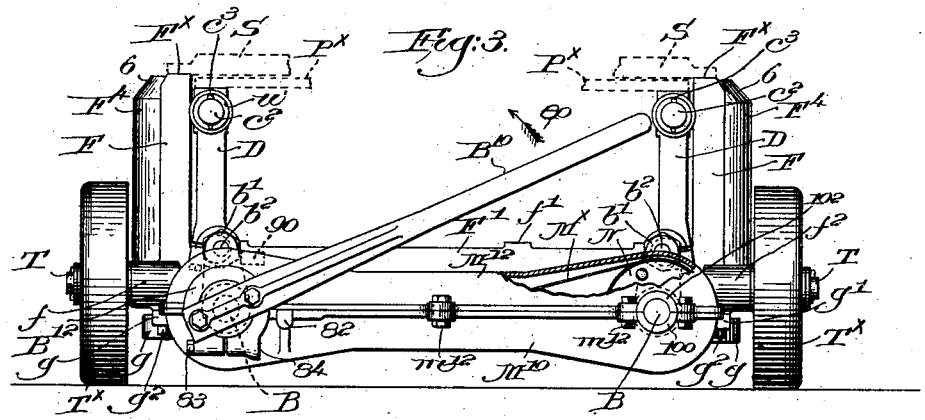
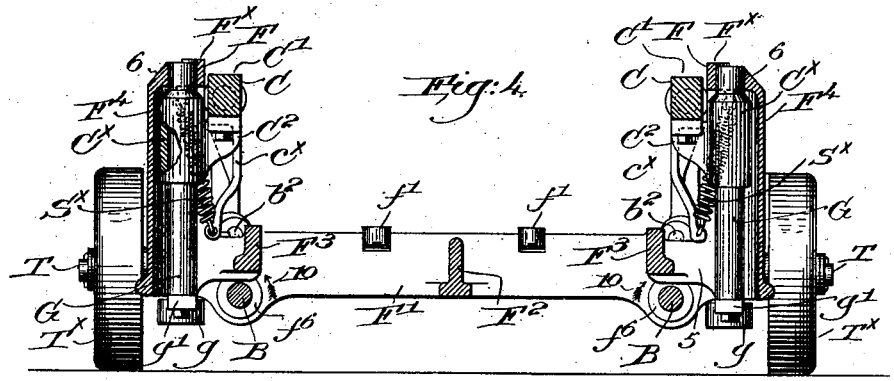
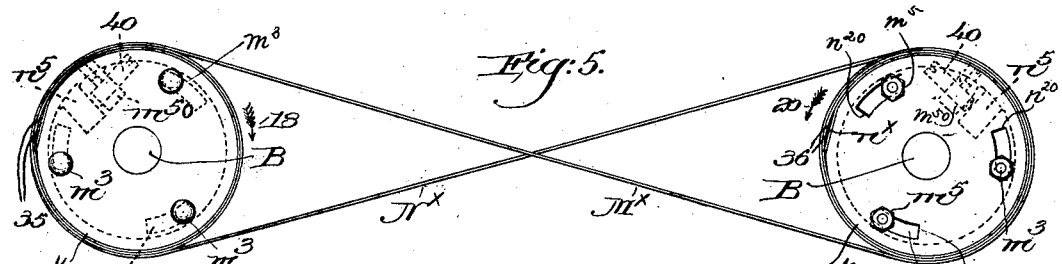
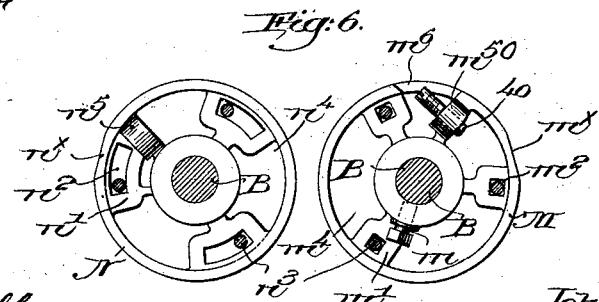

UNITED STATES PATENT OFFICE.

JOHN ANDERSON, OF HOPEDALE, MASSACHUSETTS, ASSIGNOR TO DRAPER COMPANY, OF HOPEDALE, MASSACHUSETTS, A CORPORATION OF MAINE.

MOLDING-MACHINE.

SPECIFICATION forming part of Letters Patent No. 713,047, dated November 11, 1902.

Application filed November 1, 1901. Serial No. 80,746. (No model.)

*To all whom it may concern:*

Be it known that I, JOHN ANDERSON, a citizen of the United States, and a resident of Hopedale, county of Worcester, State of Massachusetts, have invented an Improvement in Molding-Machines, of which the following description, in connection with the accompanying drawings, is a specification, like characters on the drawings representing like parts.

This invention relates to machines for facilitating the construction of molds for metal-founding; and it has for its object the production of a very accurate, simple, and efficient machine particularly adapted for use in making molds from large and intricate patterns and so constructed that rapid operation by unskilled labor will not injuriously affect the character of the work produced.

The machine forming the subject-matter of my present invention belongs to the type wherein the parting face of the mold is made by a firmly-supported stripper-plate, the pattern being movable in a path absolutely at right angles thereto, and it is well known that any slight deviation of the pattern from such path when it is "drawn" from the mold will produce a corresponding defect in the latter. Manifestly when molding large patterns the error in the movement of the pattern will be magnified, and it has been exceedingly difficult heretofore to produce large molds accurately with machines of this type, owing to the lost motion between the moving parts and to the rapid deterioration of the machine by use.

I have produced a machine which can be successfully used for the largest pieces of work capable of production by machine-molding and which while being highly accurate in its operation is of a strong and durable construction, so that the use thereof will not throw the operating parts out of true.

The various novel features of my invention will be hereinafter described in the specification and particularly pointed out in the following claims.

Figure 1 is a side elevation, centrally broken out to save space, of a molding-machine illustrating one embodiment of my invention, the truck-wheels being omitted on the nearer side, the pattern-carrier being elevated. Fig. 2 is a top or plan view thereof, also centrally broken out. Fig. 3 is a right-hand end elevation of the machine shown in Fig. 1, the casing for the connection between the operating-shafts being broken out. Fig. 4 is a transverse section on the line 4 4, Fig. 2, looking toward the left to show more clearly the sliding connections between the pattern-carrier and the vertical guides therefor. Fig. 5 is an enlarged transverse detail on the line 5 5, Fig. 2, showing the connection between the two operating-shafts. Fig. 6 is an enlarged detail of the inner faces of a pair of sheaves to be referred to, the sheaves being opened out and shown side by side; and Fig. 7 is an enlarged detail in elevation of the adjustable connection between one of the operating-shafts and the power-transmitting member.

Referring to Figs. 1 to 4, inclusive, the operative parts of the machine are mounted on a strong and heavy frame comprising upturned parallel sides F, which to save weight are made open and constitute practically trusses which are very strong and rigid for their weight, the said sides having their upper longitudinal edges carefully planed, as at $F^\times$, to constitute a support for a stripper-plate S, (partly shown in dotted lines, Fig. 3,) which will be secured to the tops of the sides by suitable screws. The sides are rigidly connected at their bottoms by a base comprising transverse girders F', centrally connected by a longitudinal brace-bar $F^2$. Two longitudinal L-shaped bars $F^3$ extend from one to the other of the girders near the lower portions of the sides and are connected therewith at intervals by suitable stiffening-webs 5, the tops of the bars being planed and in the same horizontal plane as the tops of upright bosses $f'$ on the girders F' to constitute a support for a stool-plate when it is desired to use such a device, the stool-plate supports being entirely inside of the path of movement of the pattern-carrier, to be hereinafter referred to. The frame is thus open-ended, and thus is adapted to support a very large stripper-plate much longer than the actual length of the frame, and by having the frame open at its ends a pattern-plate of corresponding length and also a stool-plate of corresponding length may be used.

Inasmuch as this apparatus is heavy, I have herein shown means for facilitating its movement from place to place, and for this purpose the frame at its base is provided with transverse bearings $f^2$ to receive truck-shafts T, the ends of which extend beyond the bearings and have mounted thereupon suitable truck-wheels $T^\times$. The upturned sides of the frame are provided at each end and on the exterior thereof with vertical and tranversely-curved enlargements $F^4$, open at their lower ends and at their upper ends provided with circular holes $f^4$ to receive the upper ends of depending guides G, (shown as cylindrical posts,) the lower ends of which are provided with heads $g$, having laterally-extended wings $g'$ to rest against seats $f^5$ on the frame and to which they are secured by suitable bolts $g^2$. The enlargements $F^4$ not only support at their upper ends the tops of the guides, but they also partly surround the same and act as shields to protect the inclosed parts from access of sand or loam, the tops of the enlargements being coned or inclined, as at 6, to shed sand falling thereupon. The said enlargements are opened toward the inside of the machine, as clearly shown in Fig. 4, for a purpose to be described.

The pattern-carrier in the present embodiment of my invention comprises two separated and parallel vertical side members, herein shown as heavy bars C, the tops C' of which are planed and are located in the same horizontal plane to constitute a support for the pattern-plates $P^\times$ (see Fig. 3) of any usual construction, the pattern-plate being secured in place on the pattern-carrier by suitable screws. Each side of the pattern-carrier has secured to it opposite the vertical guides G a depending bracket $C^2$, provided outside of the said member C with an elongated vertical hub $C^\times$, which embraces the adjacent guide and vertically slides thereupon, the hubs being of sufficient length, as best shown in Fig. 4, to provide an extended supporting part for each of the sides of the pattern-carrier, each side being thus vertically movable and slidably mounted upon two of the upright guides G. It is to be observed that the two sides of the pattern-carrier are unconnected, so that there is a clear space between them, thus providing ample room for any desired stool-plate and stools carried thereby. Each carrier side is provided with two depending struts $c^\times$, to the lower ends of which are secured counterbalancing-springs $S^\times$, the upper ends of the springs being attached to suitable ears 8 on the upper part of the frame sides F, the springs normally tending to lift the pattern-carrier and its pattern-plate and rendering the operation of the machine easier.

The pattern-plate must manifestly be moved toward and from the stripper-plate in a plane exactly parallel thereto at all times. Otherwise in drawing the pattern from the mold the latter will be injured or so distorted as to render it worthless, and inasmuch as there is no direct connection between the sides of the pattern-carrier in my present invention I have provided novel and perfectly-acting means for raising and lowering the pattern-carrier, so that the pattern-plate can always move in a plane absolutely in parallelism with the stripper-plate. To this end the base of the frame is provided with bearings $f^6$, two of such bearings being located at each side, as nearly directly in the path of movement of the sides of the pattern-carrier as is practically possible, each pair of bearings supporting an operating-shaft B, the ends of which extend beyond the ends of the frame, as shown in Figs. 1 and 2, said shafts being in parallelism. Each shaft has secured to it, on the portion projecting beyond the end of the frame, a sleeve $b$, having two rigidly-attached crank-arms $b'$, connected by a crank-pin $b^2$, so that each shaft is provided with two cranks, one at each end of the frame and outside of the transverse girders F'.

A power-transmitting member or link D is pivotally connected at its lower end with each crank, and at its upper end it is pivotally mounted on the reduced and cylindrical end $c^2$ of the adjacent member C of the pattern-carrier and held in place thereon by a suitable washer $w$ and cotter-pin or other device $c^3$, so that when a shaft is lifted the attached member of the pattern-carrier will be raised or lowered, and in the drawings I have shown the pattern-carrier in its uppermost position, as it would be during the construction of the mold.

Referring to Fig. 3, it will be seen that at such time a straight line will pass through the centers of one of the operating-shafts, the crank-pin $b^2$, and the reduced cylindrical portion $c^2$ of the member C, the crank-arms of the two shafts at such time being inclined outward at a slight angle with vertical lines drawn through the centers of their respective shafts. Now if the shafts B are rotated simultaneously in opposite directions, as indicated by the arrows 10, Fig. 4, and through equal arcs, it will be manifest that the sides of the pattern-carrier will be lowered simultaneously and through equal distances, so that the pattern-plate carried thereby will descend or move away from the stripper-plate in a plane parallel thereto, it being remembered that when the pattern-carrier is in its uppermost position the top faces C' of the pattern-carrier sides are in the same plane and exactly parallel to the plane of the stripper-plate supports $F^\times$. In order to effect this simultaneous, opposite, and equal angular movement of the two operating-shafts B, I have devised novel yet simple means for accomplishing the same.

Referring to Figs. 1 and 2, the shafts at the right-hand end of the machine project a considerable distance beyond the cranks at that end, and I have mounted upon each shaft on such extended portion two sheaves M N. One of these sheaves, as M, is rigidly secured to the shaft and its fellow is adjustably mounted thereon, and the two pairs of sheaves are so located that the fast one on one shaft is located opposite to the adjustable one on the other shaft, and vice versa, as shown in Fig. 2. A suitable set-screw $m$ (see Fig. 6) secures the sheave M to the shaft, and said sheave is provided on its periphery with a flattened portion $m^\times$, and its hub is connected with the rim portion by a series of radial arms $m'$, each having an aperture $m^2$ to receive a clamping-bolt $m^3$, which extends through the web $m^4$ of the sheave and through the apertures $m^2$ in the arms into segmental slots $n^2$ in radial arms $n'$, connecting the rim and the hub of the sheave N, the web $n^4$ of said sheave having formed in it continuations of the segmental slots, as $n^{20}$, Fig. 5. When the several clamping-bolts are set up by means of suitable nuts $m^5$, (see Fig. 5,) the two sheaves of a pair will be firmly clamped together, and inasmuch as the sheave M is rigidly secured to the shaft the sheave N must also move rigidly with the shaft. The sheave N also has its periphery flattened, as at $n^\times$, Fig. 6, and an inwardly-extended stop-ear $n^5$ is adapted to receive the end of an adjusting-screw 40, mounted in a lateral ear $m^{50}$ on the sheave M, the face of the latter being cut away, as at $m^6$, Fig. 6, to permit access to said adjusting-screw. By loosening the clamp-bolts $m^3$ the angular position of the sheave N relative to its fellow sheave M can be changed with great nicety and accuracy by means of the adjusting-screw 40, the relative position of the parts being clearly shown in Fig. 5. To connect the two shafts, I use two like flexible bands or belts $M^\times N^\times$, preferably made of thin sheet-steel of great tensile strength, and the bands are secured to the two pairs of sheaves in a peculiar manner.

Referring to Fig. 5, the band $M^\times$ is attached at one end by suitable screws or pins 35 to the periphery of the left-hand one of the sheaves M, and it is wound about the periphery of said sheave a couple of complete turns, as shown in Fig. 5, and in the direction of the arrow 18 and with a part of an additional turn over the top of the sheave. It is then carried down beneath the opposite adjustable sheave N and wound thereupon several times, and its end is secured at the flattened part $n^\times$ by fasteners 36, the winding on this sheave N being in the direction of the arrow 20, which is opposite to that indicated by the arrow 18. The band $N^\times$ is similarly secured to the periphery of the fast sheave M on the right-hand shaft and is wound about the same two turns and a fraction in the direction of the arrow 20 and is carried across to the sheave N on the left-hand shaft B, viewing Fig. 5, and wrapped around it in the direction of the arrow 18 and secured to the flattened portion of such sheave. Of course it will be understood that the winding of the bands is effected after their ends are secured to the sheaves. The bands thus cross between the two shafts, and the latter are connected in such a manner by the said bands that rotation of either shaft will be transmitted to the other shaft to rotate it simultaneously, but in the opposite direction, through the same arc, the angular movement of the two shafts being thereby precisely alike. The adjustment provided for each pair of sheaves is to take up any stretch in the belts, inasmuch as the latter, although preferably made of steel, will stretch in time, and it also provides for effecting the absolutely simultaneous and opposite equal rotative movement of the shafts. One of the shafts has secured to it on its end projecting beyond the sheaves a sleeve $B^8$, to which is attached an operating-handle $B^{10}$, and, viewing Fig. 3, if the said handle be swung in the direction of the arrow 80 the cranks of the two sheaves B will be swung outwardly and downwardly simultaneously, thereby lowering the pattern-carrier to draw the pattern, such movement of the shafts being limited by a fixed stop 82, engaging a shoulder 84 of an adjustable stop mounted on the sleeve $B^8$. This shoulder 84 is formed on a split collar $B^{12}$, mounted on an annular enlargement $b^8$ of the sleeve $B^8$ and clamped thereupon by a suitable clamp-bolt 83, Fig. 3. By adjusting this clamp-collar the throw or drawing movement of the pattern-carrier can be increased or decreased, as desired.

To limit the upward and inward movement of the cranks when the pattern-carrier is in its highest position, I have provided the frame with the stop 90, (see Figs. 2 and 3,) which engages one of the cranks at such time. A two-part shield or cover $M^{10} M^{12}$ surrounds and incloses the bands and the two pairs of sheaves, and the two parts are secured together by suitable bolts $m^{12}$, each part or member of the shield having two half-bearings 100 102 to embrace the shafts B, which latter thereby support the shield, the fixed stop 82 being formed on one of the shield members, as shown in Figs. 2 and 3. This shield prevents the entrance of sand or loam to the operating connection between the shafts.

The constant use of a machine such as herein shown will in time cause wear to some of the coöperating moving parts, and more particularly to the points of connection of the power-transmitting members D with the pattern-carrier and operating crank-shafts B, and in order that such wear may be compensated for and taken up conveniently I have shown a simple but effective adjustable connection between each of said power-transmitting members or links D and its corresponding crank. The lower end of the link is enlarged and split, as at $d$, (see Fig. 7,) to form a bearing for an eccentric bushing $d^\times$, rotatably mounted on the crank-pin $b^2$, said bushing being embraced by the split end of the link and normally clamped rigidly thereupon by a suitable clamp-screw $d'$. The bushing is provided with a polygonal head $d^2$ at one end between one of the pair of crank-arms $b'$ and the adjacent face of the split end of the link, and when it is desired to make an adjustment of the connection described the clamp-screw $d'$ is loosened, and by means of a wrench or spanner applied to the polygonal head $d^2$ the bushing $d^\times$ is turned in one direction or the other on the crank-pin $b^2$ and within the split end of the link sufficiently to take up any wear and prevent lateral backlash or lost motion due to the same, and when such adjustment is effected the link is again clamped upon the bushing by setting up the screw $d'$.

The power to raise and lower the pattern-carrier is transmitted to the latter from the operating-shafts and points closely adjacent the pattern-plate itself, and the draft is very direct and approaches as closely as may be the vertical path of movement of the pattern-carrier.

The pattern-carrier is actuated simultaneously and equally at its four corners, each of the four transmitting members D' performing its own work and acting simultaneously with all of the others by the mechanism herein shown, so that there is no possibility of any uneven movement of the pattern-plate, all parts thereof necessarily being moved in unison and equally.

When the pattern is drawn from the mold, there is no unbalanced pull laterally, because the two links D at one side of the pattern-plate pull outwardly and downwardly and the two opposite members D pull outwardly in the opposite direction and with a like force and also downwardly, absolutely preventing any tendency to lateral movement of the pattern.

I have herein shown one practical embodiment of my invention in the form which I now prefer to attain the best results; but various changes in detail and arrangement may be made without departing from the spirit and scope of my invention.

Having fully described my invention, what I claim as new, and desire to secure by Letters Patent, is—

1. In a molding-machine, a frame having upright sides, vertical guides mounted thereon, a pattern-carrier comprising two separate sides slidable on said guides, two parallel operating crank-shafts extended longitudinally of and mounted on the frame at its base, means to simultaneously rock said shafts oppositely through equal arcs, said means including two crossed, flexible members oppositely wound around the axes of the shafts and connected therewith at their ends, and power-transmitting links pivotally connected with the pattern-carrier sides and with the crank-shafts, whereby rotative movement of the latter will simultaneously and equally raise and lower the pattern-carrier sides.

2. In a molding-machine, a frame, a pattern-carrier vertically slidable thereon, two parallel operating-shafts mounted on the frame at its base, links pivotally connected at their upper ends with the sides of the pattern-carrier and at their lower ends eccentrically connected with the operating-shafts, and means to rock said shafts oppositely in unison, said means including two crossed flexible members oppositely wound around the axes of the shafts and connected therewith at their ends.

3. In a molding-machine, a frame, a pattern-carrier vertically slidable thereon, two parallel operating-shafts mounted on the frame at its base, power-transmitting members connecting the pattern-carrier and shafts, to raise and lower the former by rotative movement of the latter, and means to rock said shafts oppositely in unison through equal arcs, said means including two crossed metallic bands oppositely wound around the axes of the shafts and secured at their ends to the shafts.

4. In a molding-machine, a frame, a pattern-carrier vertically slidable thereon, two parallel operating-shafts mounted on the frame at its base, power-transmitting members connecting the pattern-carrier and shafts, to raise and lower the former by rotative movement of the latter, and means to rock said shafts oppositely in unison through equal arcs, said means including two crossed flexible members oppositely wound around the axes of the shafts, one end of each band being fixedly secured to one shaft and adjustably secured to the other shaft, and vice versa.

5. In a molding-machine, a frame, a pattern-carrier vertically slidable thereon, two parallel operating-shafts mounted on the frame at its base, power-transmitting members connecting the pattern-carrier and shafts, to raise and lower the former by rotative movement of the latter, and means to rock said shafts oppositely in unison through equal arcs, said means including two crossed, flexible metallic members connected at their ends eccentrically with the shafts.

6. In a molding-machine, a frame, a pattern-carrier vertically slidable thereon, two parallel operating-shafts mounted on the frame at its base, power-transmitting members connecting the pattern-carrier and shafts, to raise and lower the former by rotative movement of the latter, a fixed sheave and an adjacent, angularly-adjustable sheave on each shaft, the fixed sheave on one shaft being opposite the adjustable sheave on the other, and a flexible metallic band secured to and extended around each fixed sheave and extended oppositely around and secured to the adjustable sheave on the other shaft, the two bands crossing between the shafts, whereby rotative movement of one shaft will impart simultaneously the same angular movement to the other shaft, in an opposite direction.

7. In a molding-machine, a frame, a pattern-carrier vertically slidable thereon, two parallel operating-shafts mounted on the frame at its base, power-transmitting members connecting the pattern-carrier and shafts, to raise and lower the former by rotative movement of the latter, two like sheaves mounted on each shaft, a flexible band secured at its ends to the two opposite sheaves and wound about them oppositely, the two bands crossing between the shafts, and an actuating-handle secured to one of the shafts, whereby angular movement thereof will be simultaneously transmitted to the other shaft by the crossed bands, through an equal arc and in the opposite direction.

8. In a molding-machine, a frame having upright sides, links depending from the sides of the pattern-carrier and connected at their lower ends with the crank-shafts, and means to oppositely rock the latter in unison through equal arcs, to impart to the pattern-carrier simultaneously at opposite sides thereof uniform rising or falling movement, said means including two crossed, flexible members oppositely wound around the axes of the crank-shafts and connected therewith at their ends.

9. In a molding-machine, a frame having upright, open sides, external vertical guide members rigidly secured to the sides, a pattern-carrier comprising separate parallel side members having hubs extended outwardly through the sides of the frame to embrace and slide upon the guide members, a pair of parallel operating-shafts mounted on the frame, actuating connections between each side member of the pattern-carrier and a shaft, to raise and lower the said members by rotative movement of the shafts, and means to oppositely rock the latter in unison through equal arcs.

10. In a molding-machine, a frame having upturned portions to constitute a stripper-plate support and provided with vertical guides, a pattern-carrier vertically slidable on the guides and adapted to support a pattern-plate, two operating-shafts mounted in parallelism on the frame and operatively connected with the pattern-carrier, a fixed sheave and an adjacent movable sheave on each shaft, the fixed sheave on one being located opposite the loose sheave on the other, an adjusting device to move the loose sheave angularly relative to the adjacent fixed sheave, means to clamp said sheaves together when adjusted, and two flexible steel bands each secured at one end to a fixed sheave, wound around it and oppositely wound around the adjustable sheave on the other shaft and secured to said sheave, said bands crossing between the shafts, whereby angular movement of one shaft will impart simultaneously opposite and equal angular movement to the other shaft.

11. In a molding-machine, a frame having upright sides, a pattern-carrier vertically slidable thereon, two parallel operating-shafts mounted on the frame and extended beyond the ends thereof, a crank on the extended end of each shaft, a link connecting the upper part of the pattern-carrier with each crank, means connecting said shafts to effect opposite angular movement thereof in unison through equal arcs, an actuating-lever mounted on one of the shafts, and adjustable means on said shaft to limit rotative movement thereof in the direction to lower the pattern-carrier.

12. In a portable molding-machine, an open-ended frame having upright sides and transverse bearings at its base, shafts in said bearings having attached truck-wheels, to support the frame, an open-ended pattern-carrier vertically slidable on the upright sides of the frame, operating-shafts mounted in parallelism on the frame, power-transmitting connections between them and the pattern-carrier, to raise and lower the latter by rotative movement of the shafts, and means to effect opposite angular movement of the shafts in unison through equal arcs, said means including two crossed, flexible members oppositely wound around the axes of the shafts and connected therewith at their ends.

13. In a molding-machine, a frame having upturned sides to constitute a stripper-plate support, two parallel operating-shafts mounted on the lower part of the frame, adjustable means to rock said shafts in unison in opposite directions, said means including two crossed flexible members oppositely wound around the axes of the shafts and connected therewith at their ends; a pattern-carrier vertically slidable on the frame, power-transmitting connections between the pattern-carrier and the shafts, to raise and lower the former by rocking movement of the shafts, and counterbalancing-springs connecting the upper part of the frame with the pattern-carrier.

In testimony whereof I have signed my name to this specification in the presence of two subscribing witnesses.

JOHN ANDERSON.

Witnesses:
GEORGE OTIS DRAPER,
J. WALDO SAMPSON.